(12) United States Patent
    Sirianni et al.

(10) Patent No.:     US 9,906,410 B2
(45) Date of Patent:     Feb. 27, 2018

(54) DYNAMIC DATA ACCESS CONFIGURATION

(71) Applicant: NetApp Inc., Sunnyvale, CA (US)

(72) Inventors: Eric Sirianni, Cary, NC (US); Stephen William Daniel, Chapel Hill, NC (US); William Earl Taylor, Jr., Bahama, NC (US); William Randall Pafford, Durham, NC (US)

(73) Assignee: NETAPP, INC., Sunnyvale, CA (US)

( * ) Notice: Subject to any disclaimer, the term of this patent is extended or adjusted under 35 U.S.C. 154(b) by 401 days.

(21) Appl. No.: 14/499,731

(22) Filed: Sep. 29, 2014

(65) Prior Publication Data

US 2016/0094390 A1    Mar. 31, 2016

(51) Int. Cl.
    *H04L 12/24* (2006.01)
    *H04L 29/08* (2006.01)
    *H04L 29/06* (2006.01)
    *G06F 17/30* (2006.01)

(52) U.S. Cl.
    CPC .... *H04L 41/0816* (2013.01); *G06F 17/30194* (2013.01); *G06F 17/30197* (2013.01); *G06F 17/30283* (2013.01); *G06F 17/30345* (2013.01); *H04L 67/1097* (2013.01); *H04L 67/38* (2013.01)

(58) Field of Classification Search
    CPC . H04L 41/0816; H04L 67/38; H04L 67/1097; G06F 17/30283
    See application file for complete search history.

(56) References Cited

U.S. PATENT DOCUMENTS 5,329,630 A    7/1994    Baldwin
5,970,488 A    10/1999   Crowe et al.
              (Continued)

FOREIGN PATENT DOCUMENTS

EP    1521184    4/2005

OTHER PUBLICATIONS

International Search Report and Written Opinion for Application No. PCT/US2013/052034 dated Nov. 26, 2013, 10 pages.
(Continued)

*Primary Examiner* — Edward Kim
(74) *Attorney, Agent, or Firm* — Klein, O'Neill & Singh, LLP

(57) ABSTRACT

One or more techniques and/or systems are provided for dynamic data access configuration. For example, a mapping may be maintained for compute nodes of a distributed processing system. The mapping may comprise access permission assignments of at least some compute nodes to shared data segments (e.g., read access and/or write access permissions). The mapping may be updated based upon configuration changes for the distributed processing system (e.g., addition of a new compute node, failure of a compute node, granting or removal of access to a shared data segment for an existing compute node, etc.). The updated mapping may be applied to the distributed processing system during operation of the distributed processing system (e.g., access may be granted to original instances of shared data segments based upon the configuration change; compute nodes and/or the distributed processing system may be kept online and operational while applying the configuration change; etc.).

20 Claims, 8 Drawing Sheets

(56) References Cited

U.S. PATENT DOCUMENTS

| | | | |
|---|---|---|---|
| 5,970,510 A * | 10/1999 | Sher | G06F 9/345 |
| | | | 711/149 |
| 6,360,220 B1 | 3/2002 | Forin | |
| 6,421,711 B1 * | 7/2002 | Blumenau | G06F 3/0605 |
| | | | 709/213 |
| 6,789,071 B1 | 9/2004 | Kapoor et al. | |
| 7,099,913 B1 | 8/2006 | Bertone et al. | |
| 7,120,650 B2 * | 10/2006 | Loy | G06F 9/542 |
| 7,574,439 B2 | 8/2009 | Everhart et al. | |
| 8,510,265 B1 * | 8/2013 | Boone | G06F 17/302 |
| | | | 707/609 |
| 2002/0059309 A1 * | 5/2002 | Loy | G06F 9/542 |
| 2003/0159136 A1 | 8/2003 | Huang et al. | |
| 2003/0217058 A1 | 11/2003 | Ladan-Mozes et al. | |
| 2006/0224851 A1 * | 10/2006 | Tamura | G06F 3/0605 |
| | | | 711/170 |
| 2009/0063411 A1 * | 3/2009 | Bish | G06F 17/30575 |
| 2010/0077249 A1 * | 3/2010 | Das | G06F 3/0622 |
| | | | 714/4.1 |
| 2010/0146122 A1 * | 6/2010 | Prince, Jr. | G06F 9/5083 |
| | | | 709/226 |
| 2010/0191705 A1 * | 7/2010 | Barabas | G06F 17/30362 |
| | | | 707/626 |
| 2012/0159021 A1 | 6/2012 | Anantha et al. | |
| 2012/0272247 A1 | 10/2012 | Scott et al. | |
| 2014/0032595 A1 | 1/2014 | Makkar et al. | |
| 2014/0149783 A1 * | 5/2014 | Georgiev | G06F 11/0793 |
| | | | 714/4.2 |

OTHER PUBLICATIONS

Final Office Action on co-pending (U.S. Appl. No. 13/558,061) dated Nov. 25, 2016.

Non-Final Office Action on co-pending (U.S. Appl. No. 13/558,061) dated Jun. 28, 2017.

Final Office Action on co-pending (U.S. Appl. No. 13/558,061) dated Dec. 15, 2017.

* cited by examiner

DYNAMIC DATA ACCESS CONFIGURATION

BACKGROUND

A distributed computing or processing system comprises multiple computers, such as compute nodes or processing nodes, which operate relatively independently to achieve a common goal. Data processing, analytics, and/or other jobs may be performed using distributing computing (e.g., hundreds or thousands of compute nodes may process a relatively large data set to accomplish a job). A scheduler may be used to schedule tasks, corresponding to portion of a job, which are to be performed by various compute nodes.

DETAILED DESCRIPTION

Figure 1:
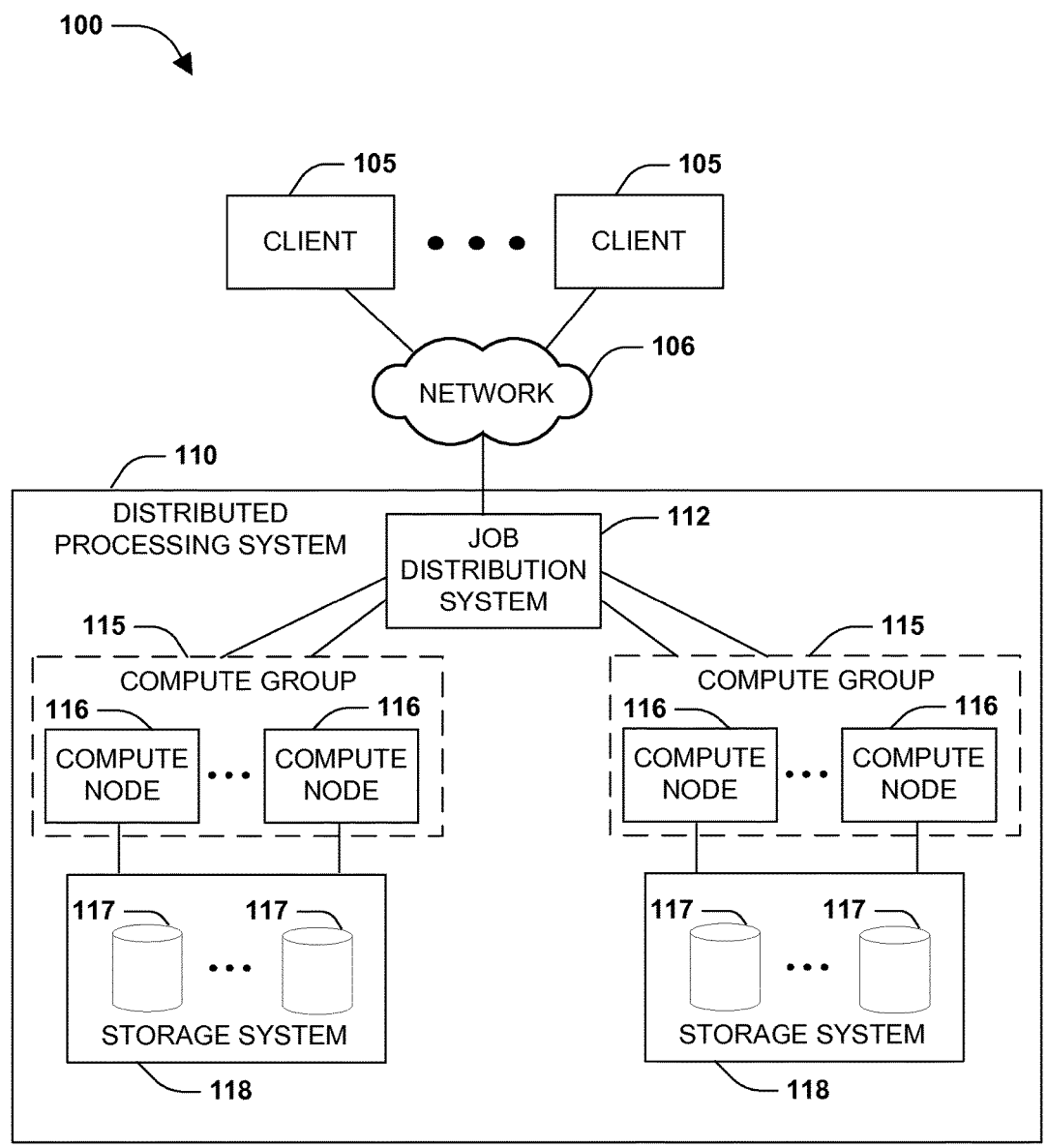
FIG. 1 is a component block diagram illustrating an example distributed processing environment in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for dynamic data access configuration are provided herein. A distributed processing system (e.g., a Hadoop distributed processing system) may comprise a plurality of compute nodes configured to perform various tasks, such as distributed data processing and/or analytics, associated with shared data segments (e.g., a data segment that may be shared between compute nodes) stored in data storage objects (e.g., logical unit numbers (LUNs)) of storage systems (e.g., storage devices attached to compute nodes using SAS interconnects or storage devices accessible to compute nodes through a storage controller). A mapping may be maintained for the compute nodes. The mapping may comprise access permission assignments (e.g., read access and/or write access) for compute nodes to shared data segments. A segment, such as a shared data segment, may comprise a portion of a cluster data set. For example, a collection of shared data segments together comprise the cluster data set against which analytic jobs may be run. In this way, dynamically associating shared data segments to computer nodes allows for fault-tolerance and elastic processing of jobs such as analytic jobs.

A configuration change for the distributed processing system may be identified. For example, the configuration change may specify that a first compute node is to be assigned read access to a shared data segment (A), and that write access and read access to the shared data segment (A) and a shared data segment (B) may be removed from a second compute node. The configuration change may be applied to the mapping to create an updated mapping. The updated mapping may be applied to the distributed processing system (e.g., the first compute node may be instructed to mount a first LUN associated with the shared data segment (A) and the second compute node may be instructed to unmount the first LUN associated with the shared data segment (A) and a second LUN associated with the shared data segment (B)) during operation of the distributed processing system. In an example, the updated mapping may be applied (e.g., the updated mapping may comprise a re-balancing of access permission assignments that may be applied to the distributed processing system) without generating copies of data (e.g., the first compute node may be provided with access to an original instance of the shared data segment (A)), which may otherwise occur within distributed processing systems, such as Hadoop, when implementing configuration changes. For example, a new compute node may be added to the distributed processing system, and the new computer node may be given shared access to an existing data segment. In another example, the updated mapping may be applied without taking compute nodes and/or the distributed processing system offline. In this way, dynamic configuration changes may be supported for distributed processing systems.

To provide context for dynamic data access configuration, FIG. 1 illustrates an example of a distributed processing environment 100. Distributed processing environment 100 comprises a plurality of client systems 105, a distributed processing system 110, and a network 106 connecting the client systems 105 and the distributed processing system 110. As illustrated in FIG. 1, the distributed processing system 110 comprises two compute groups 115 and a job distribution system 112. Respective compute groups 115 comprise a plurality of compute nodes 116 that are coupled with the job distribution system 112 and a storage system 118. Two compute groups 115 are illustrated for simplicity of discussion. The distributed processing system 110 can comprise any number of compute groups 115, where a compute group can comprise any number of compute node 116. The storage system 118 can comprise a storage controller (not shown) and a number of mass storage devices (or storage containers) 117, such as disks. Alternatively, some or all of the mass storage devices 117 can be other types of storage, such as flash memory, solid-state drives (SSDs), tape storage, etc. However, for ease of description, the storage devices 117 are assumed to be disks herein and the storage system 118 is assumed to be a disk array.

The job distribution system 112 coordinates functions relating to the processing of jobs. This coordination function may comprise one or more of: receiving a job from a client of the client systems 105, dividing a job into tasks, assigning or scheduling the tasks to one or more compute nodes 116, monitoring progress of the tasks, receiving the divided tasks results, combining the divided tasks results into a job result, and reporting the job result to the client. In one embodiment, the job distribution system 112 can comprise, for example, one or more Hadoop Jobtrackerss. The job distribution system 112 can be implemented in special-purpose hardware, programmable hardware, or a combination thereof. As illustrated, the job distribution system 112 is illustrated as a standalone element. However, the job distribution system 112 can be implemented in a separate computing device. Further, in one or more embodiments, the job distribution system 112 may alternatively or additionally be implemented in a device which performs other functions, including within one or more compute nodes.

The job distribution system 112 performs the assignment and scheduling of tasks to compute nodes 116 with some knowledge of where the required shared data segments of distributed data set reside. For example, the job distribution system 112 has knowledge of the compute groups 115 and the data stored on the associated storage system(s) 118. The job distribution system 112 attempts to assign or schedule tasks at compute nodes 116 with data locality, at least in part, to improve performance. In some embodiments, the job distribution system 112 comprises some or all of the metadata information associated with the distributed file system in order to map the tasks to the appropriate compute nodes 116. Further, in some embodiments, the job distribution system 112 can determine whether the task requires write access to one or more shared data segments and, if so, can assign or schedule the task with a compute node of the compute nodes 116 that has read-write access to the shared data segment. The job distribution system 112 can be implemented in special-purpose hardware, programmable hardware, or a combination thereof.

Compute nodes 116 may be any type of microprocessor, computer, server, central processing unit (CPU), programmable logic device, gate array, or other circuitry which performs a designated processing function (e.g., processes the tasks and accesses the specified shared data segments). The compute nodes 116 can comprise one or more interfaces for communicating with networks, other compute nodes, and/or other devices. In some embodiments, compute nodes 116 may comprise other elements and can implement these various elements in a distributed fashion.

The storage system 118 can comprise a storage server or controller (not shown) and one or more disks 117. In one embodiment, the one or more disks 117 may be configured in a disk array. For example, the storage system 118 can be one of the E-series storage system products available from NetApp®, Inc. The E-series storage system products include an embedded controller (or storage server) and disks. The E-series storage system provides for point-to-point connectivity between the compute nodes 116 and the storage system 118. In one embodiment, the connection between the compute nodes 116 and the storage system 118 is a serial attached SCSI (SAS). However, the compute nodes 116 may be connected by other means known in the art such as, for example over any switched private network.

In another embodiment, one or more of the storage systems can alternatively or additionally include a FAS-series or E-series of storage server products available from NetApp®, Inc. In this example, the storage server (not shown) can be, for example, one of the FAS-series or E-series of storage server products available from NetApp®, Inc. In this configuration, the compute nodes 116 are connected to the storage server via a network (not shown), which can be a packet-switched network, for example, a local area network (LAN) or wide area network (WAN). Further, the storage server can be connected to the disks 117 via a switching fabric (not shown), which can be SAS, an internet small computer system interface (iSCSI), or other protocol over a packet-switched network (e.g., Ethernet) or other network, for example. It is noted that, within the network data storage environment, any other suitable number of storage servers and/or mass storage devices, and/or any other suitable network technologies, may be employed.

The one or more storage servers within storage system 118 can make some or all of the storage space on the one or more disks 117 available to the compute nodes 116 in the attached or associated compute group 115. For example, respective disks of the one or more disks 117 can be implemented as an individual disk, multiple disks (e.g., a RAID group) or any other suitable mass storage device(s). Storage of information in the storage system 118 can be implemented as one or more storage volumes that comprise a collection of physical storage disks 117 cooperating to define an overall logical arrangement of volume block number (VBN) space on the volume(s). Respective logical volumes are generally, although not necessarily, associated with their own file system.

The disks within a logical volume/file system are typically organized as one or more groups, wherein a group may be operated as a Redundant Array of Independent (or Inexpensive) Disks (RAID). Most RAID implementations, such as a RAID-6 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-6 level implementation, although it should be understood that other types and levels of RAID implementations may be used according to the techniques described herein. One or more RAID groups together form an aggregate. An aggregate can contain one or more volumes. The storage system 118 can receive and respond to various read and write requests from the compute nodes 116, directed to shared data segments stored in or to be stored in the storage system 118.

In one embodiment, various shared data segments of the distributed data set are stored in data storage objects (e.g., LUNs) on storage systems 118. Together the storage systems 118 comprise the entire distributed data set. The data storage objects in a storage system of the data storage systems 118 are cross-mapped into respective compute nodes 116 of an associated compute group 115 so that any compute node 116 in the compute group 115 can access any of the shared data segments stored in the local storage system via the respective data storage object. In some embodiments, all members of a compute group can access all storage objects associated with that compute group. In some embodiments, the mapping may be restricted so that fewer than all compute nodes can access each data storage object. There may be costs associated with each mapping of a data storage object to a compute node. The system may be more efficient and/or more scalable if the number of mappings is capped. If the cap is less than the number of compute nodes in the group, then only some compute nodes can access each data storage object. A compute node of the compute nodes 116 owns (e.g., has read-write access) to one data storage object mapped into the compute node of the compute nodes 116 and read-only access to some of the remaining data storage objects mapped into the compute nodes 116. In some embodiments, one or more compute nodes (e.g., all compute nodes, a single compute node, less than all compute nodes) may have read and/or write data paths. For example, multiple compute nodes may have read-write access to a single LUN.shared data segment In another configuration, multiple paths are created to the various shared data segments of the distributed data set stored in data storage objects (e.g., LUNs) on the local storage system. For example, a compute group 115, having three compute nodes 116, has three paths to the various shared data segments. One or more of these paths (e.g., all three paths) are read-write for the data, and the compute nodes 116 can read and write data to/from the various shared data segments contention-free via multiple paths.

As provided herein, a distributed processing system coordinator may be associated with the distributed processing environment 100 (e.g., a Hadoop distributed processing system). For example, the job distribution system 112 may comprise the distributed processing system coordinator. The distributed processing system coordinator may be configured to dynamically implement configuration changes to the distributed processing environment 100 (e.g., granting or denying read access and/or write access permissions for the plurality of compute nodes 116).

Figure 2:
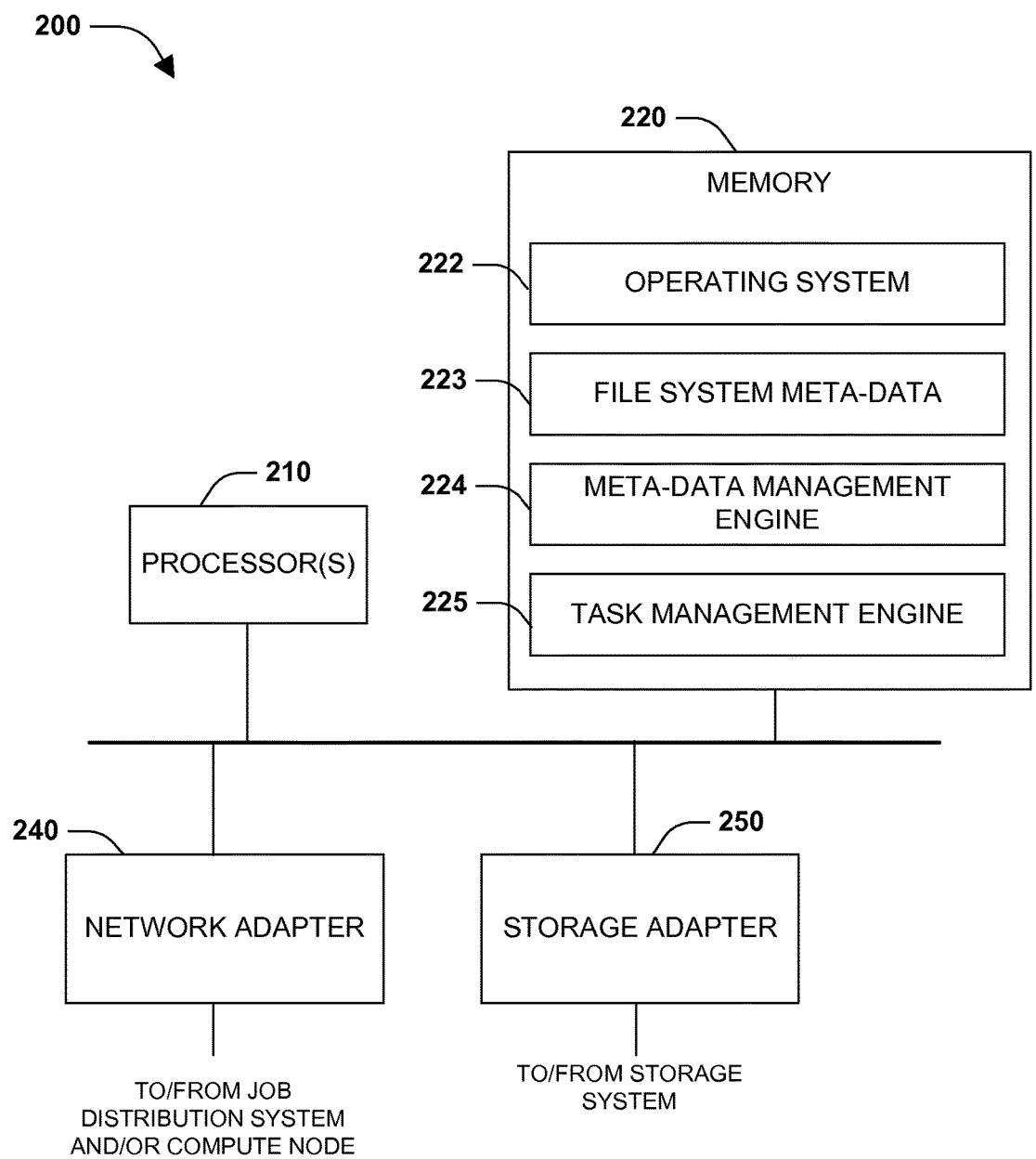
FIG. 2 is a component block diagram illustrating an example of a hardware architecture that may implement one or more compute nodes in accordance with one or more of the provisions set forth herein.

FIG. 2 is a diagram illustrating an example of the hardware architecture of a compute node 200 that can implement one or more compute nodes, for example, compute nodes 116 of FIG. 1. The compute node 200 may be any type of microprocessor, computer, server, central processing unit (CPU), programmable logic device, gate array, or other circuitry which performs a designated processing function (e.g., processes the tasks and accesses the specified shared data segments). In an illustrative embodiment, the compute node 200 comprises a processor subsystem 210 that comprises one or more processors. The compute node 200 comprises a memory 220, a network adapter 240, and a storage adapter 250, which may be interconnected by an interconnect 260.

The compute node 200 can be embodied as a single- or multi-processor storage server executing an operating system 222. The operating system 222, portions of which are typically resident in memory and executed by the processing elements, controls and manages processing of the tasks. The memory 220 illustratively comprises storage locations that are addressable by the processor(s) 210 and adapters 240 and 250 for storing software program code and data associated with the techniques introduced here. For example, some of the storage locations of memory 220 can be used for cached file system meta-data 223, a meta-data management engine 224, and a task management engine 225. The cached file system meta-data 223 can comprise meta-data associated with each data storage object that is mapped into the compute node 200. This file system meta-data is typically, although not necessarily, ingested at startup and is updated periodically and/or based on other triggers generated by the meta-data management engine 224.

The task management engine can include the software necessary to process a received request to perform a task, identify the particular shared data segments required to complete the task, and process the shared data segments to identify the particular data storage object on which the shared data segment resides. The task management engine can also generate a request for the shared data segment. The processor 210 and adapters may, in turn, comprise processing elements and/or logic circuitry configured to execute the software code. It will be apparent to those skilled in the art that other processing and memory implementations, including various computer readable storage media, may be used for storing and executing program instructions pertaining to the techniques introduced here. Like the compute node itself, the operating system 222 can be distributed, with modules of the storage system running on separate physical resources.

The network adapter 240 includes a plurality of ports to couple compute nodes 116 with the job distribution system 112 and/or with other compute nodes 116 both in the same compute group 115 and in different compute groups 115. The ports may couple the devices over point-to-point links, wide area networks, virtual private networks implemented over a public network (Internet) or a shared local area network. The network adapter 240 thus can comprise the mechanical components as well as the electrical and signaling circuitry used to connect the compute node 200 to the network 106 of FIG. 1 and/or other local or wide area networks. Illustratively, the network 106 can be embodied as an Ethernet network or a Fibre Channel network. In one embodiment, clients 105 can communicate with the job distribution system 112 and the job distribution system 112 can communicate with compute nodes 116 over the network 106 by exchanging packets or frames of data according to pre-defined protocols, such as Transmission Control Protocol/Internet Protocol (TCP/IP).

The storage adapter 250 cooperates with the operating system 222 to access information requested by the compute nodes 116. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 117. The storage adapter 250 includes a plurality of ports having input/output (I/O) interface circuitry that couples with the disks over an I/O interconnect arrangement, such as serial attached SCSI (SAS) or iSCSI over Ethernet. In one embodiment, the storage adapter 250 includes, for example, an E-series adapter to communicate with a NetApp E-Series storage system 118.

The operating system 222 facilitates compute node 116 access to shared data segments stored in data storage objects on the disks 117. As discussed above, in certain embodiments, a number of data storage objects or LUNs are mapped into each compute node 116. The operating system 222 facilitates the compute nodes 116 processing of the tasks and access to the required shared data segments stored in the data storage objects on the disks 117.

Figure 3:
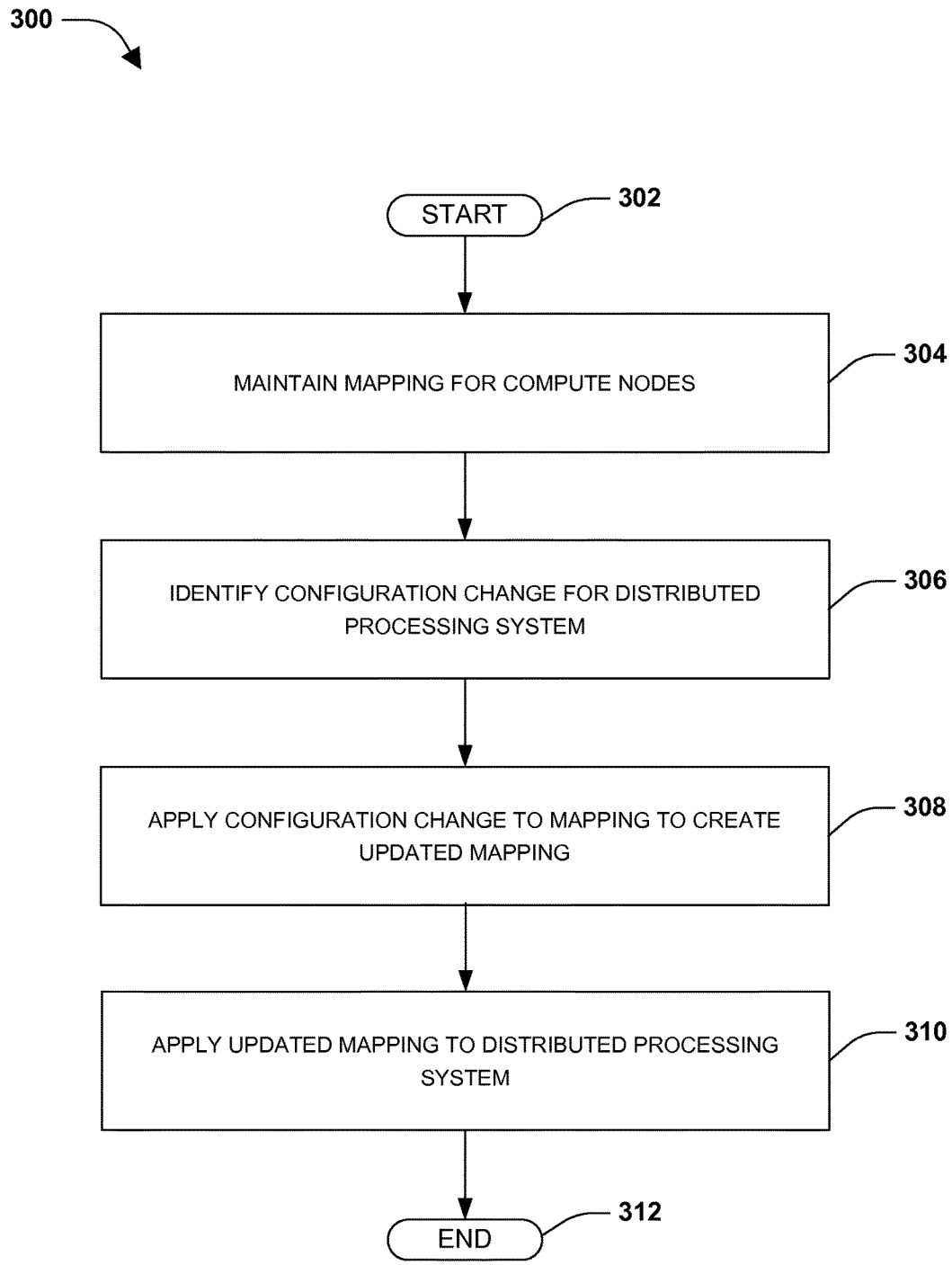
FIG. 3 is a flow chart illustrating an exemplary method of dynamic data access configuration.

One embodiment of dynamic data access configuration is illustrated by an exemplary method 300 of FIG. 3. At 302, the method starts. At 304, a mapping may be maintained (e.g., within a shared configuration database) for compute nodes of a plurality of compute nodes in a distributed processing (e.g., a Hadoop distributed processing system). The mapping may comprise access permission assignments of at least some of the compute nodes to shared data segments stored in data storage objects (e.g., a LUN) of storage systems. For example, a first compute node may be granted read access to a shared data segment (A) and write access and read access to a shared data segment (B); a second compute node may be granted write access to the shared data segment (A), read access to a shared data segment (C), and read access to a shared data segment (D); etc. In an example, the mapping may specify that at least one compute node has read access and write access to a shared data segment, and that 0 or more compute nodes have read access, but not write access, to the shared data segment.

At 306, a configuration change for the distributed processing system may be identified. The configuration change may correspond to a shared data segment stored in a data storage object, such as data of a LUN. In an example, the configuration change corresponds to a change in an access permission type of a compute node for accessing a shared data segment (e.g., read/write access may be changed to a read-only access). In an example, the configuration change may correspond to the addition of a new compute node to the distributed processing system. In an example, the configuration change may correspond to a detected failure of a compute node. In an example, the configuration change may correspond to a specification, by an administrator or other user, of a change corresponding to a change of an access permission type for a compute node (e.g., the second compute node may be granted read access to a shared data segment (G); write access to a shared data segment (F) may be removed from a third compute node; etc.). In an example, the configuration change may be received by a daemon configuration infrastructure (e.g., the administrator may send the configuration change to a network address of the daemon configuration infrastructure using a representational state transfer (REST) application programming interface (API), such as through a web browsing interface or other interface). At 308, the configuration change may be applied to the mapping to create an updated mapping. For example, the updated mapping may specify that the second compute node now has access to the shared data segment (G) and that the third compute node does not have write access to the shared data segment (F). At 310, the updated mapping may be applied to the distributed processing system (e.g., the updated mapping may comprise a re-balancing of access permission assignments that may be applied to the distributed processing system) during operation of the distributed processing system. In an example, the configuration change may be applied as a sequenced series of actions (e.g., which may be orchestrated by management software with or without administrator control). For example, a move read-write ownership of a LUN configuration change may involve a revoke write ownership action for a first compute node, a confirm revocation action, a grant write ownership action to a second compute node, and/or other actions. In this way, a small set of configuration changes may be sequenced as part of a relatively large change. In an example, the configuration change may correspond to a failure or removal of a first compute node (e.g., a heartbeat of the first compute node may be lost; a lack of responsiveness of the first compute node may be identified as the failure; an administrator may specify that the first compute node is being decommissioned; etc.) having read access and write access to a shared data segment.

The updated mapping may specify that the read access and write access to the shared data segment is to be removed from the first compute node, and that a second compute node is to have read access and write access to the shared data segment (e.g., so that 1 compute node has read access and write access to the shared data segment). In this way, the updated mapping may be applied to the distributed processing system by instructing the second compute node to scan a storage controller to identify a data storage object (e.g., a LUN) comprising the shared data segment, mount the data storage object for read access and write access, and to notify a distributed processing name node (e.g., a Hadoop Namenode) that the second compute node, and not the first compute node, provides access to the data storage object such as access to the shared data segment. If and/or when the first compute node is operational, the first compute node may be instructed to unmount the data storage object.

In an example, the configuration change may correspond to an addition of a compute node (e.g., a heartbeat or handshake introduction message may be received from the compute node; an administrator may specify that the compute node was added to the distributed processing system; etc.). The updated mapping may specify that the compute node has read access to a shared data segment (C). In this way, the updated mapping may be applied to the distributed processing system by instructing the compute node to scan a storage controller to identify a data storage object comprising the shared data segment (C), mount the data storage object for read access, and to notify the distributed processing name node that the compute node provides access to the data storage object such as access to the shared data segment.

In an example, the configuration change may correspond to a LUN and one or more compute nodes. For example, the configuration change may specify that a first compute node is granted access to a shared data segment of the LUN and that permission to access the shared data segment of the LUN is to be removed from a second compute node. The updated mapping may be applied to the distributed processing system by instructing the first compute node to mount the LUN on the first compute node so that the first compute node is granted access to the shared data segment of the LUN, and by instructing the second compute node to unmount the LUN on the second compute node so that permission to access the shared data segment of the LUN is removed from the second compute node.

In this way, during operation of the distributed processing system, compute nodes are dynamically provided with access to shared data segments and/or have access permission to shared data segments dynamically denied, such as during operation of the compute nodes (e.g., a LUN, comprising such shared data segments, may be mounted to or unmounted from a compute node without taking the compute node offline). The updated mapping may be applied to the distributed processing system, to implement the configuration change, while maintaining a current hardware configuration of the distributed processing system and with continued operation of the distributed processing system (e.g., without taking the distributed processing system or a compute node offline). The updated mapping may be applied to the distributed processing system, to implement the configuration change, by granting access to original shared data segments, as opposed to making copies of the original shared data segments (e.g., Hadoop may otherwise copy an original shared data segment, initially assigned to a first compute node, in order to provide a second compute node with read access and/or write access to a copied instance of the original shared data segment as opposed to the original shared data segment).

In an example, the configuration change may be applied to a storage system where compute nodes are connected to storage arrays by dedicated point-to-point SAS links, iSCSI over a packet-switched network (e.g., Ethernet), etc. For example, automatic assignment of read access and/or write access may be provided to such compute nodes without interrupting operation of the compute nodes. In this way, dynamic data access configuration may be applied to a storage system utilizing fixed SAS interconnects. At 312, the method ends.

Figure 4A:
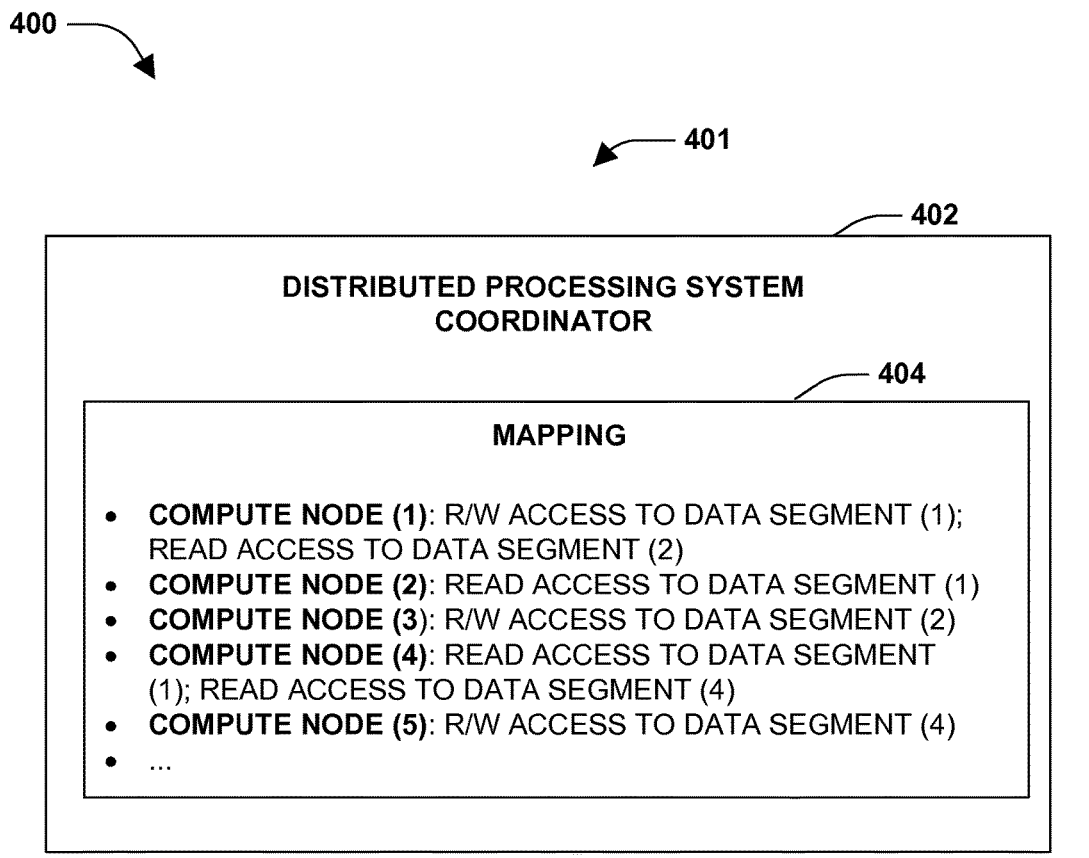
FIG. 4A is a component block diagram illustrating an exemplary system for dynamic data access configuration.
Figure 4A:
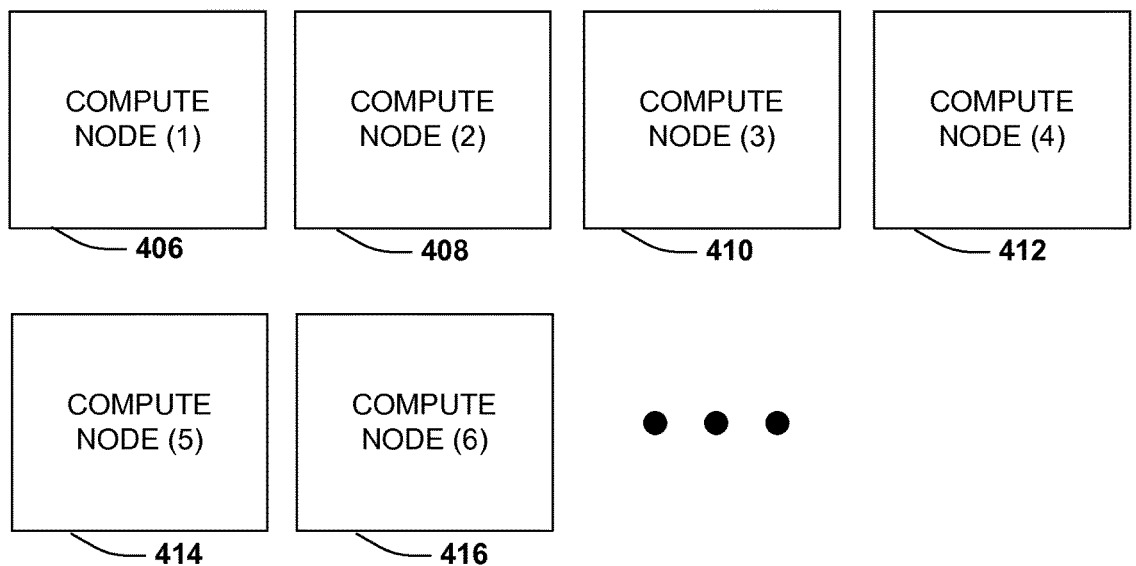

FIGS. 4A-4D illustrate examples of a system 401, comprising a distributed processing system coordinator 402, for dynamic data access configuration. FIG. 4A illustrates a distributed processing system (e.g., distributed processing environment 100 of FIG. 1) comprising a plurality of nodes, such as a compute node (1) 406, a compute node (2) 408, a compute node (3) 410, a compute node (4) 412, a compute node (5) 414, a compute node (6) 416, and/or other compute nodes not illustrated. The distributed processing system coordinator 402 may be associated with the distributed processing system (e.g., the job distribution system 112 of FIG. 1 may comprise the distributed processing system coordinator 402). The distributed processing system coordinator 402 may maintain a mapping 404 for the compute nodes. The mapping 404 may comprise permission assignments of at least some compute nodes to shared data segments stored in data storage objects (e.g., LUNs) of storage systems (e.g., storage devices, such as hard drives, attached to compute nodes by SAS connections and/or storage devices accessible to compute nodes through storage controllers). For example, the mapping 404 may specify that the compute node (1) 406 has read access and write access to a shared data segment (1) and read access to shared data segment (2), that the compute node (2) 408 has read access to the shared data segment (1), that the compute node (3) 410 has read access and write access to the shared data segment (2), that the compute node (4) 412 has read access to the shared data segment (1) and read access to a shared data segment (4), that the compute node (5) 414 has read access and write access to the shared data segment (4), etc.

Figure 4B:
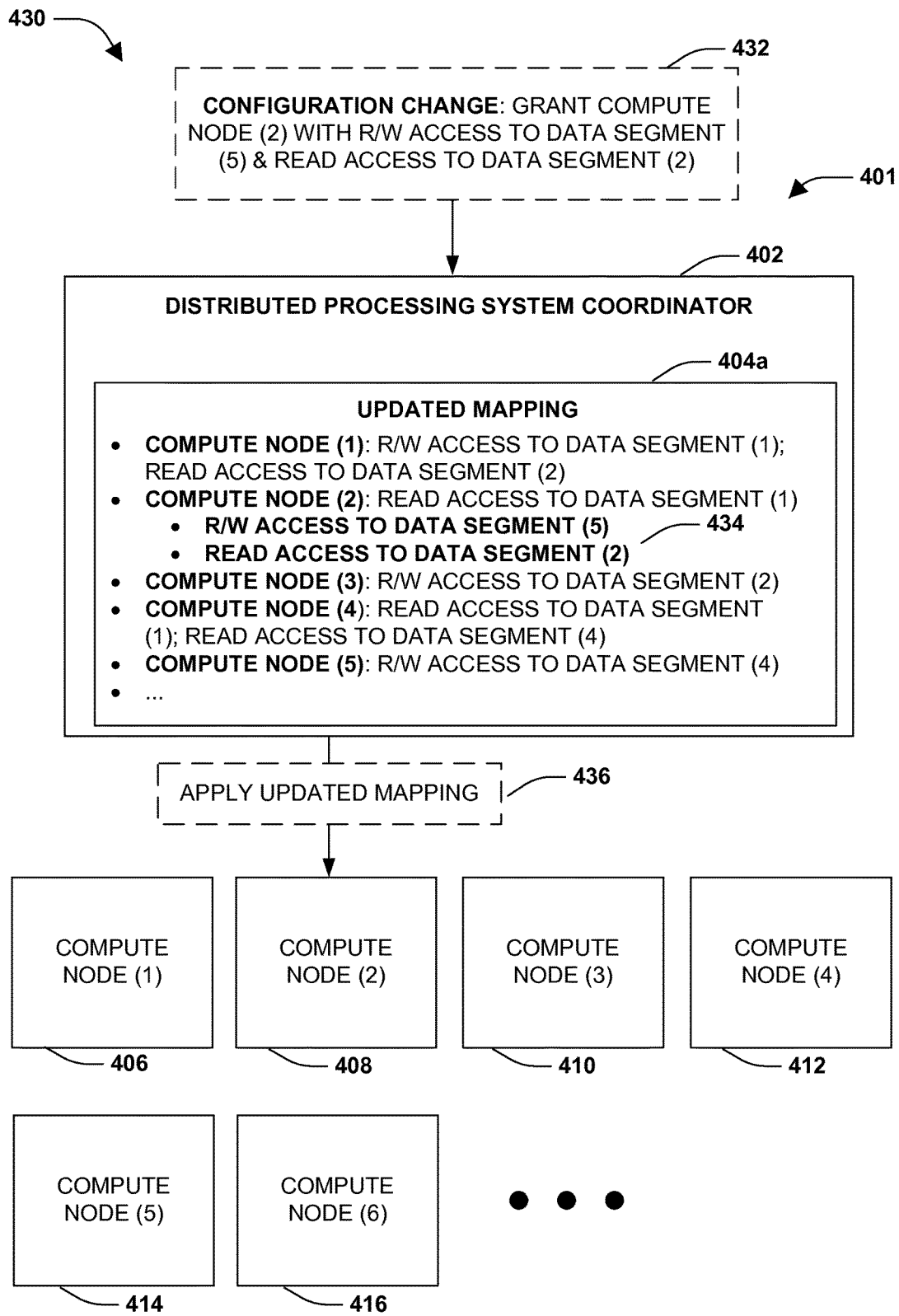
FIG. 4B is a component block diagram illustrating an exemplary system for dynamic data access configuration, where an updated mapping is applied to a distributed processing system based upon a configuration change to the distributed processing system.

FIG. 4B illustrates an example 430 of the distributed processing system coordinator 402 dynamically implementing a configuration change 432 for the distributed processing system. In an example, the distributed processing system coordinator 402 may receive the configuration change 432 through a REST API (e.g., accessible to an administrator through a web interface or other computing interface) or may detect the configuration change 432 based upon a failure, removal, or addition of a compute node. In an example, the distributed processing system coordinator 402 may comprise functionality that may implement various polices. For example, a policy may indicate that all LUNs are to be read-write owned by at least one compute node, and thus when the last compute node that has read-write ownership of a LUN fails, the distributed processing system coordinator 402 implements the policy to create a corresponding configuration change, such as the configuration change 432 (e.g., in this way, the distributed processing system coordinator 402 decides which LUNS are assigned where on a group of compute nodes). The configuration change 432 may specify that compute node (2) 408 is to be granted read access and write access to a shared data segment (5) and read access to the shared data segment (2). The distributed processing system coordinator 402 may update 434 the mapping 404 based upon the configuration change 432 to create an updated mapping 404*a* specifying the newly granted access for the compute node (2) 408.

The distributed processing system coordinator 402 may apply 436 the updated mapping 404*a* to the distributed processing system. In an example, the updated mapping 404*a* and/or the configuration change 432 may be applied as a sequenced set of actions. For example, the distributed processing system coordinator 402 may instruct the compute node (2) 408 to identify one or more data storage objects associated with the shared data segment (5) and the shared data segment (2) (e.g., by scanning one or more storage controllers to identify one or more LUNs comprising the shared data segment (5) and/or the shared data segment (2)), and to mount such data storage objects to the compute node (2) 408 so that the compute node (2) 408 can provide read access and write access to the shared data segment (5) and read access to the shared data segment (2). In this way, dynamic data access configuration may be implemented for the distributed processing system during operation of the distributed processing system, such as without making copies of data (e.g., the compute node (2) 408 may be granted permission to access original instances of the shared data segment (5) and/or the shared data segment (2)) and/or without taking the compute node (2) 408 and/or other compute nodes offline.

Figure 4C:
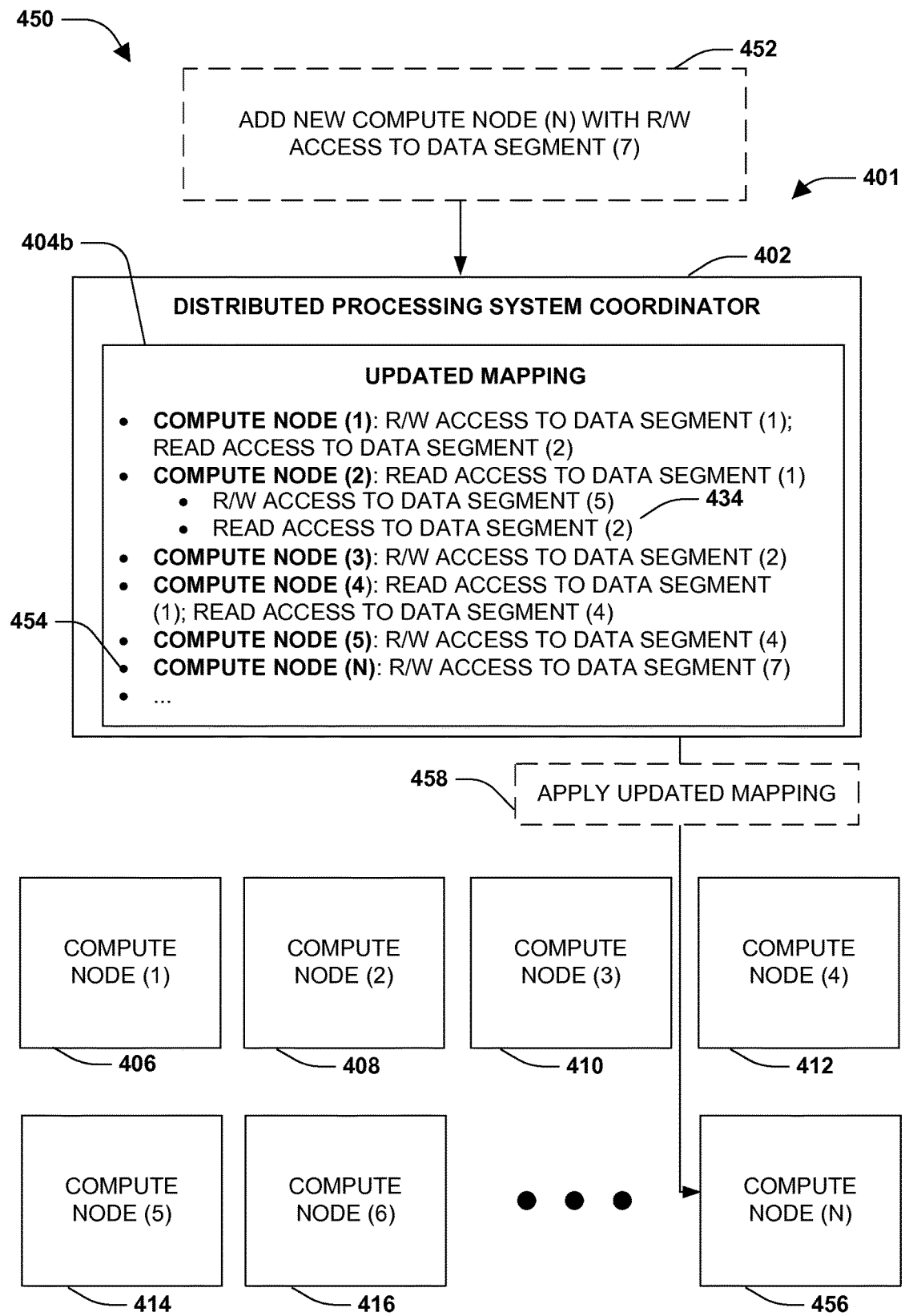
FIG. 4C is a component block diagram illustrating an exemplary system for dynamic data access configuration, where an updated mapping is applied to a distributed processing system based upon an addition of a new compute node to the distributed processing system.

FIG. 4C illustrates an example 450 of the distributed processing system coordinator 402 dynamically implementing a configuration change 452 for the distributed processing system. In an example, the distributed processing system coordinator 402 may receive the configuration change 452. The configuration change 452 may specify that a new compute node (N) 456 is to be granted read access and write access to a shared data segment (7). The distributed processing system coordinator 402 may update 454 the updated mapping 404*a* based upon the configuration change 452 to create an updated mapping 404*b* specifying the newly granted access for the new compute node (N) 456.

The distributed processing system coordinator 402 may apply 458 the updated mapping 404*b* to the distributed processing system. For example, the distributed processing system coordinator 402 may instruct the new compute node (N) 456 to identify a data storage object associated with the shared data segment (7) (e.g., by scanning one or more storage controllers to identify a LUN comprising the shared data segment (7)), and to mount the data storage object to the new compute node (N) 456 so that the new compute node (N) 456 can provide read access and write access to the shared data segment (7). In this way, dynamic data access configuration may be implemented for the distributed processing system during operation of the distributed processing system, such as without making copies of data (e.g., the new compute node (N) 456 may be granted permission to access an original instance of the shared data segment (7)) and/or without taking the new compute node (N) 456 and/or other compute nodes offline.

Figure 4D:
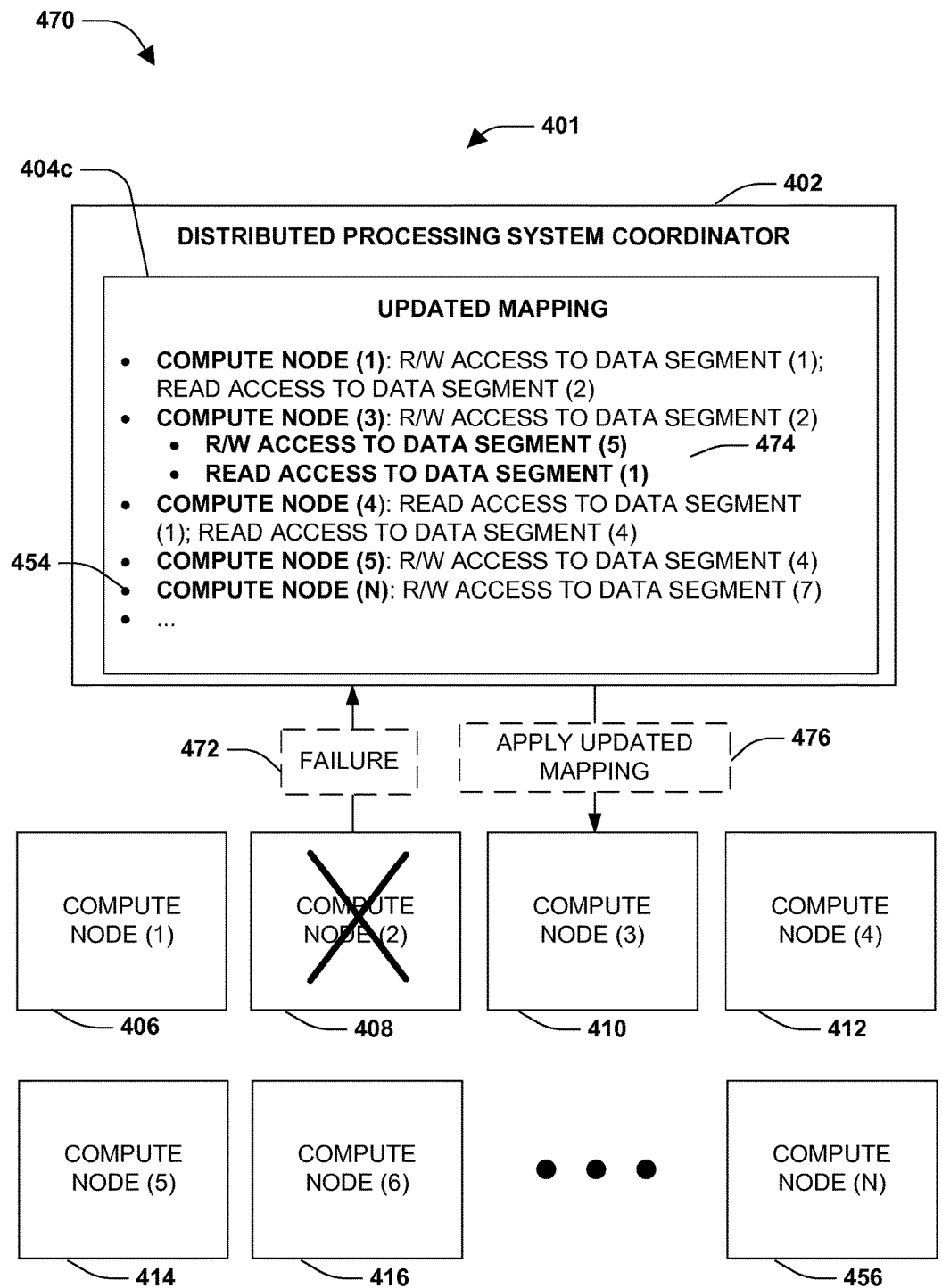
FIG. 4D is a component block diagram illustrating an exemplary system for dynamic data access configuration, where an updated mapping is applied to a distributed processing system based upon a failure of a compute node.

FIG. 4D illustrates an example 470 of the distributed processing system coordinator 402 dynamically implementing a configuration change for the distributed processing system. In an example, the distributed processing system coordinator 402 may identify the configuration change based upon a failure 472 of the compute node (2) 408 that had read access and write access to shared data segment (5) and read access to shared data segment (1) and shared data segment (2). The configuration change may indicate that compute node (3) 410 already has read access to shared data segment (2) and is a candidate for being granted read access and write access to shared data segment (5) and read access to shared data segment (1) because such a grant of access may compensate for the failure 472 of the compute node (2) 408. The distributed processing system coordinator 402 may update 474 the updated mapping 404*b* based upon the configuration change to create an updated mapping 404*c* specifying the newly granted access for the compute node (3) 410. The distributed processing system coordinator 402 may remove, from the updated mapping 404*c*, the read access and write access to shared data segment (5) and the read access to shared data segment (1) and shared data segment (2) for the compute node (2) 408.

The distributed processing system coordinator 402 may apply 476 the updated mapping 404*c* to the distributed processing system. For example, the distributed processing system coordinator 402 may instruct the compute node (3) 410 to identify one or more data storage objects associated with the shared data segment (5) and the shared data segment (1) (e.g., by scanning one or more storage controllers to identify one or more LUNs comprising the shared data segment (5) and/or the shared data segment (1)), and to mount such data storage objects to the compute node (3) 410 so that the compute node (3) 410 can provide read access and write access to the shared data segment (5) and read access to the shared data segment (1). In this way, dynamic data access configuration may be implemented for the distributed processing system during operation of the distributed processing system, such as without making copies of data (e.g., the compute node (3) 410 may be granted permission to access an original instance of the shared data segment (5) and the shared data segment (1)) and/or without taking the compute node (3) 410 and/or other compute nodes offline.

Figure 5:
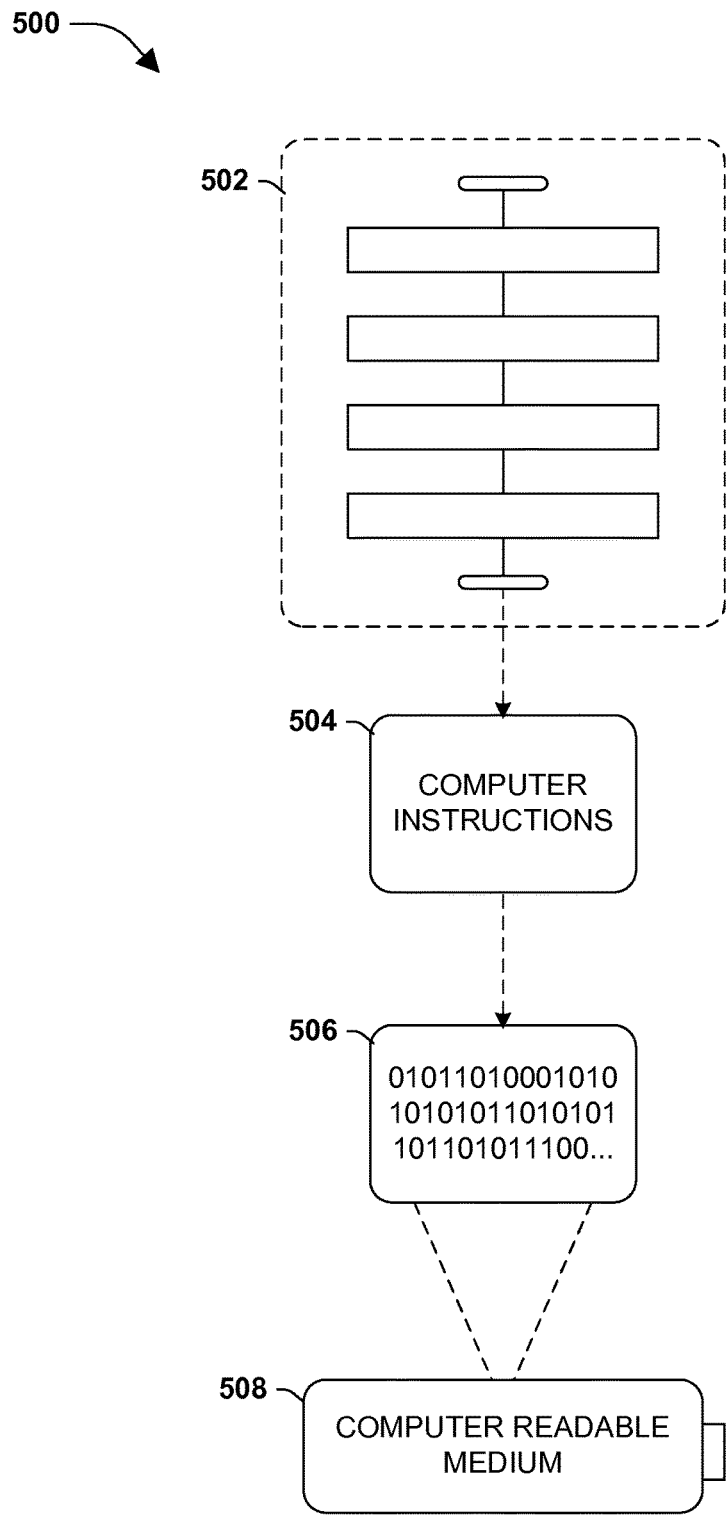
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 401 of FIGS. 4A-4D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for dynamic data access configuration, comprising:
    a processor device distributed processing system coordinator configured to:
    maintain a mapping for compute nodes of a plurality of compute nodes in a distributed processing system where the plurality of compute nodes execute a plurality of tasks for a common task using shared data segments, and the mapping comprising access permission assignments of at least some of the compute nodes to the shared data segments stored in data storage objects of storage systems accessible to the plurality of compute nodes for executing the plurality of tasks; wherein the distributed system coordinator assigns the plurality of tasks between the plurality of compute nodes for completing the common task by determining whether a task from the plurality of tasks requires write access to one or more shared data segments and then assigns the task to a specific compute node that has read-write access to the one or more shared data segments;
    identify a configuration change for the distributed processing system involving one or more of a change in an access permission type for any compute node for accessing a shared data segments from among shared data segments, a failure or a removal of any compute node and addition of a compute node to the distributed processing system;
    apply dynamically the configuration change to the mapping to create an updated mapping, where the updated mapping is based on a type of configuration change; wherein the updated mapping is created without taking any operational compute node offline and without generating a copy of data for a shared data segment associated with the configuration change; and
    apply the updated mapping to the distributed processing system by mounting and unmounting a data storage object during continuous operation of the distributed processing system without interruption in execution of the plurality of tasks for the common task by the plurality of compute nodes and without creating the copy data for the shared data segment associated with the configuration change.

2. The method of claim 1, the configuration change corresponding to at least one of a failure or a removal of a first compute node having read access and write access to a shared data segment, and the applying the updated mapping comprising:
    assigning a second compute node to have read access and write access to the shared data segment.

3. The method of claim 1, the configuration change corresponding to an addition of a compute node, and the applying the updated mapping comprising:
    assigning the compute node to have at least one of read access or write access to a shared data segment.

4. The method of claim 1, the configuration change corresponding to a logical unit number (LUN), the applying the updated mapping comprising:
    instructing a compute node to scan a storage controller to identify the LUN, mount the LUN, and notify a distributed processing name node that the compute node provides access to the LUN.

5. The method of claim 1, the configuration change corresponding to at least one of granting permission to or removing permission from a compute node to access a shared data segment.

6. The method of claim 1, the configuration change corresponding to changing an access permission type of a compute node for accessing a shared data segment.

7. The method of claim 1, the maintaining a mapping comprising:
    specifying that at least one compute node has read access and write access to a shared data segment; and
    specifying that 0 or more compute nodes have read access to the shared data segment.

8. The method of claim 1, the updated mapping comprising a re-balancing of access permission assignments.

9. The method of claim 1, the applying the updated mapping comprising:
    maintaining a current hardware configuration of the distributed processing system while applying the updated mapping to one or more of the compute nodes.

10. The method of claim 1, the configuration change corresponding to an original shared data segment assigned to a first compute node, and the applying the updated mapping comprising:
    assigning a second compute node to have at least one of read access or write access to the original shared data segment.

11. The method of claim 1, the configuration change corresponding to data stored in a data storage object.

12. The method of claim 1, the configuration change corresponding to a logical unit number (LUN) and a compute node, and the applying the updated mapping comprising:
    mounting the LUN on the compute node; and
    granting the compute node with access to one or more shared data segments of the LUN.

13. The method of claim 1, the configuration change corresponding to a logical unit number (LUN) and a compute node, and the applying the updated mapping comprising:
    unmounting the LUN on the compute node; and
    removing permission for the compute node to access one or more shared data segments of the LUN.

14. The method of claim 1, the applying the updated mapping comprising:
    dynamically providing a compute node with access to a shared data segment during operation of the compute node, the dynamically providing comprising mounting a logical unit number (LUN), comprising the shared data segment, to the compute node.

15. A system for dynamic data access configuration, comprising:
- a processor executable, distributed processing system coordinator configured to:
- maintain a mapping for compute nodes of a plurality of compute nodes in a distributed processing system where the plurality of compute nodes execute a plurality of tasks for a common task using shared data segments, and the mapping comprising access permission assignments of at least some of the compute nodes to the shared data segments stored in data storage objects of storage systems accessible to the plurality of compute nodes for executing the plurality of tasks; wherein the distributed processing system coordinator assigns the plurality of tasks between the plurality of compute nodes for completing the common task by determining whether a task from the plurality of tasks requires write access to one or more shared data segments and then assigns the task to a specific compute node that has read-write access to the one or more shared data segments;
- identify a configuration change for the distributed processing system involving one or more of a change in an access permission type for any compute node for accessing a shared data segment from among shared data segments, a failure or a removal of any compute node and addition of a compute node to the distributed processing system;
- apply dynamically the configuration change to the mapping to create an updated mapping, where the updated mapping is based on a type of configuration change; wherein the updated mapping is created without taking any operational compute node offline and without generating a copy of data for a shared data segment associated with the configuration change; and
- apply the updated mapping to the distributed processing system by mounting and unmounting a data storage object during continuous operation of the distributed processing system without interruption in execution of the plurality of tasks for the common task by the plurality of compute nodes and without creating the copy of data for the shared data segment associated with the configuration change.

16. The system of claim 15, the configuration change corresponding to a logical unit number (LUN) and a compute node, and the distributed processing system coordinator configured to:
- mount the LUN on the compute node; and
- grant the compute node with access to one or more shared data segments of the LUN.

17. The system of claim 15, the configuration change corresponding to a logical unit number (LUN) and a compute node, and the distributed processing system coordinator configured to:
- unmount the LUN on the compute node; and
- remove permission for the compute node to access one or more shared data segments of the LUN.

18. The system of claim 15, the configuration change corresponding to at least one of a failure or a removal of a first compute node having read access and write access to a shared data segment, and the distributed processing system coordinator configured to:
- assign a second compute node to have read access and write access to the shared data segment.

19. The system of claim 15, the configuration change corresponding to an addition of a compute node, and the distributed processing system coordinator configured to:
- assign the compute node to have least one of read access or write access to a shared data segment.

20. A non-transitory, computer readable medium comprising instructions which when executed at least in part via a processing unit perform a method for dynamic data access configuration, comprising:
- maintaining a mapping for compute nodes of a plurality of compute nodes in a distributed processing system where the plurality of compute nodes execute a plurality of tasks for a common task using shared data segments, and the mapping comprising access permission assignments of at least some of the compute nodes to the shared data segments stored in data storage objects of storage systems accessible to the plurality of compute nodes for executing the plurality of tasks; wherein a processor executable distributed processing system coordinator maintains the mapping and assigns the plurality of tasks between the plurality of compute nodes for completing the common task by determining whether a task from the plurality of tasks requires write access to one or more shared data segments and then assigns the task to a specific compute node that has read-write access to the one or more shared data segments;
- identifying by the distributed processing system coordinator, a configuration change for the distributed processing system involving one or more of a change in an access permission type for any compute node for accessing a shared data segment from among shared data segments, a failure or a removal of any compute node and addition of a compute node to the distributed processing system;
- applying dynamically by the distributed processing system coordinator, the configuration change to the mapping to create an updated mapping, where the updated mapping is based on a type of configuration change; wherein the updated mapping is created without taking any operational compute node within the distributed processing system offline and without generating a copy of data for a shared data segment associated with the configuration change and
- applying by the distributed processing system coordinator, the updated mapping to the distributed processing system by mounting and unmounting a data storage object during continuous operation of the distributed processing system without interruption in execution of the plurality of tasks for the common task by the plurality of compute nodes and without creating the copy of data for the shared data segment associated with the configuration change.

* * * * *